United States Patent
Petyt et al.

(10) Patent No.: US 12,363,626 B2
(45) Date of Patent: Jul. 15, 2025

(54) NATIONAL STEERING METHOD AND CORRESPONDING APPLICATION

(71) Applicant: THALES DIS FRANCE SAS, Meudon (FR)

(72) Inventors: Dominique Petyt, Auribeau sur Siagne (FR); Damien Bordron, Vence (FR); Jérôme Voyer, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 53 days.

(21) Appl. No.: 17/768,932

(22) PCT Filed: Oct. 16, 2020

(86) PCT No.: PCT/EP2020/079197
§ 371 (c)(1),
(2) Date: Apr. 14, 2022

(87) PCT Pub. No.: WO2021/083691
PCT Pub. Date: May 6, 2021

(65) Prior Publication Data
US 2024/0107436 A1    Mar. 28, 2024

(30) Foreign Application Priority Data
Oct. 31, 2019    (EP) ..................... 19306418

(51) Int. Cl.
*H04W 48/18* (2009.01)
*H04W 8/18* (2009.01)
*H04W 48/16* (2009.01)

(52) U.S. Cl.
CPC ........... *H04W 48/18* (2013.01); *H04W 8/183* (2013.01); *H04W 48/16* (2013.01)

(58) Field of Classification Search
CPC ...... H04W 48/18; H04W 48/16; H04W 8/183
(Continued)

(56) References Cited

U.S. PATENT DOCUMENTS

2014/0342732 A1    11/2014    Manalo et al.

FOREIGN PATENT DOCUMENTS

| EP | 2724559 B1 * | 8/2016 | ............ H04W 12/04 |
| FR | 2808645 A1 | 11/2001 | |

(Continued)

OTHER PUBLICATIONS

International Search Report (PCT/ISA/210) and Written Opinion (PCT/ISA/237) mailed on Dec. 21, 2020, by the European Patent Office as the International Searching Authority for current International Application No. PCT/EP2020/079197—[16 pages].

*Primary Examiner* — Intekhaab A Siddiquee

(57) ABSTRACT

Provided is a method for steering a terminal cooperating with a secure element in a telecommunication network to the user's home MNO or MVNO. The method includes steps of Detecting (10) a cell ID change in the telecommunication network; Verifying (11) that the terminal is present in another country than his MNO/MVNO; Verifying (12) if the secure element is connected to his MNO/MVNO; Verifying (13) if the cell ID is already memorized in the terminal or the secure element; Clearing the location information files of the secure element and make a Refresh (14) of the secure element; Verifying (15) again if the secure element is connected to the home MNO or MVNO; and G-Storing (16) the cell ID of the current telecommunication network in the terminal or in the secure element with the associated national MNO partner if it has not been previously stored.

8 Claims, 1 Drawing Sheet

(58) Field of Classification Search
USPC .......................................................... 370/338
See application file for complete search history.

(56) References Cited

FOREIGN PATENT DOCUMENTS

| WO | WO-2004066663 A1 * | 8/2004 | ............... H04W 8/12 |
| WO | WO-2007134990 A1 * | 11/2007 | ............ H04W 48/18 |
| WO | WO-2013067014 A1 * | 5/2013 | ............ H04W 48/16 |

* cited by examiner

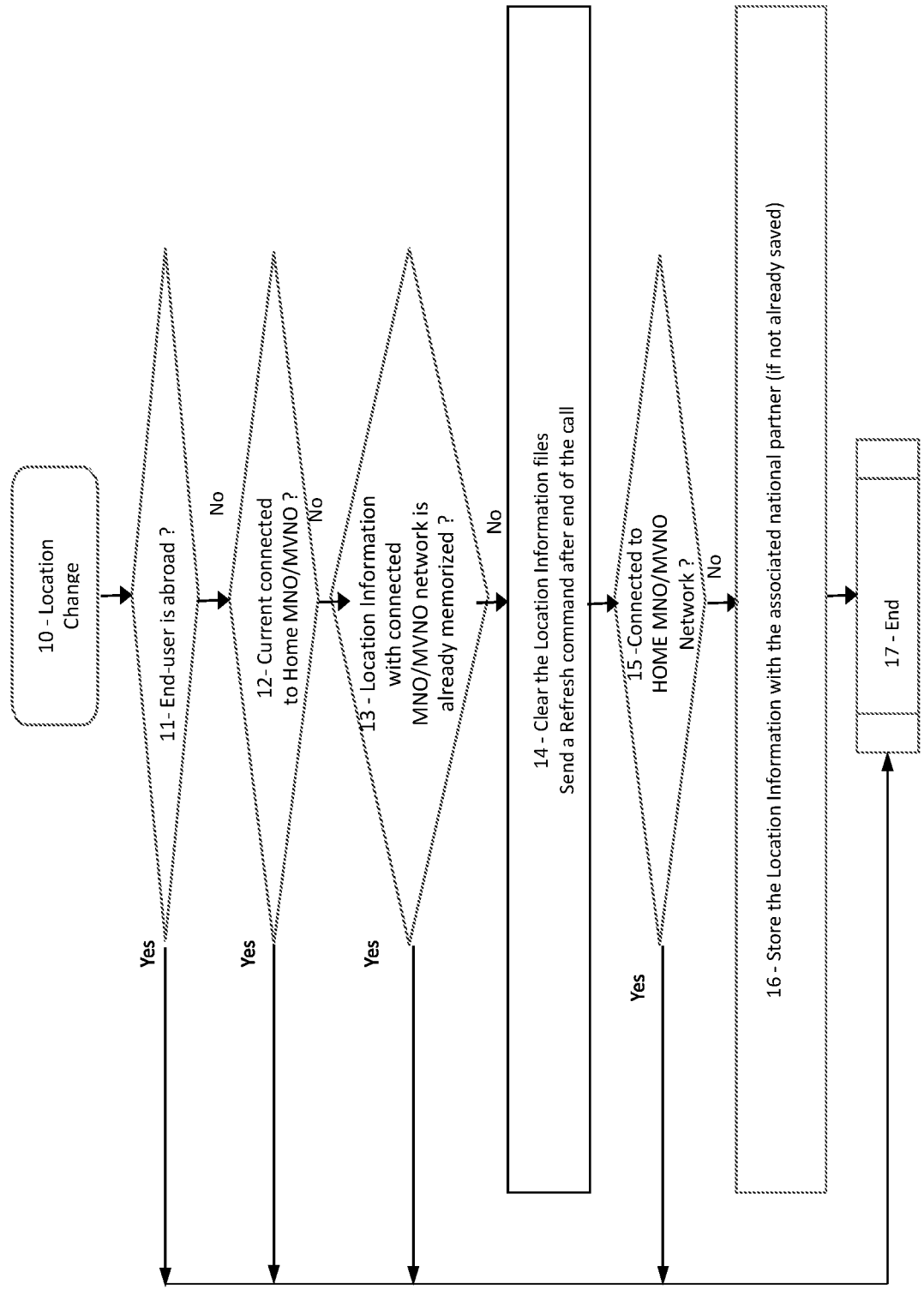

NATIONAL STEERING METHOD AND CORRESPONDING APPLICATION

TECHNICAL FIELD

The present invention concerns telecommunications and more precisely a national steering method.

BACKGROUND

A terminal (a mobile terminal like a smartphone, a PDA or a computer for example or a M2M equipment, for example connected to a moving vehicle) cooperating with a secure element (a SIM card, a UICC, an eUICC (embedded UICC) or an iUICC (integrated UICC) for example) can roam in a given country (national roaming). The secure element can also be in the form of an embedded software comprised in the terminal. The terminal is normally attached to his home network but it can happen that a Virtual MNO (MVNO) handles the secure element.

A MVNO is a mobile virtual network operator (MVNO). It is a reseller for wireless communications services. A MVNO leases wireless capacity (in effect, purchases "minutes") from a third-party mobile network operator (MNO) at wholesale prices and resells it to consumers at reduced retail prices under its own business brand. MNOs such as Verizon Wireless™ and T-Mobile™ choose to sell to MVNOs because the networks have extra capacity that would otherwise be unused. Rather than taking a loss, the MNO makes a small profit by offloading capacity in bulk at wholesale prices.

MVNOs can afford to mark down their retail prices to a certain extent because they do not have to pay radio frequency spectrum licenses and they have no infrastructure or a small one to build or maintain. Some MVNOs have no infrastructure at all (for example Free™ in France), some other MNOs have only an infrastructure not covering a whole country (for example let's assume Bouygues Telecom™ and SFR™. Free™ has therefore an agreement with a partner operator (Orange™) and sells secure elements on its own to subscribers. Let's also assume that Bouygues Telecom™ and SFR™ have also agreements for national roaming.

The present invention proposes to solve the following problem for a subscriber to a MVNO or to a MNO.

According to the standard (ETSI TS 123.122), when a terminal is connected to a national partner operator not defined in IMSI or EHPLMN files, the terminal is considered as connected in a visited network and roaming indicator is set to on. The subscriber of Free™ then believes that he is in a national roaming situation. If a subscriber of Bouygues Telecom™ enters in an area not covered by his MNO, he will be connected to a network of SFR™. This implies that the data connection can be disabled by the terminal and the consolidation data and voice consumption counters for usage in national area are not incremented in the terminal.

EHPLMN stands for Equivalent HPLMN (Home PLMN, PLMN standing for Public Land Mobile Network). The Elementary File EF_EHPLMN contains the list of PLMNs which can be regarded as a home PLMN.

The items (list of PLMNs) are listed in order of decreasing priority, meaning that the first PLMN in the list has the highest priority and the last item has the lowest priority. The secure element will try to connect to the MNOs networks present in this file by order of priority.

The problem is that when a terminal is connected to a national partner operator defined in EHPLMN file (for example Orange™ or Bouygues Telecom™) and moves to an area still covered by his MVNO or home operator, the terminal stays connected with this national partner even a better partner or a home MVNO network (in case the MVNO has an infrastructure) is available in this area.

Cost of MVNO cannot be optimized in this case of usage of national roaming. An existing solution to this problem is to steer the terminal/secure element to the national partner but it is really too complex in case of national steering and not adapted for a MVNO because there are not the owner of the network.

SUMMARY

The present invention proposes a solution to this problem.

More precisely, the present invention proposes a method for steering a terminal cooperating with a secure element in a telecommunication network to his home MNO or MVNO, the method comprising:

A—Detecting a cell ID change in the telecommunication network;
B—Verifying that the terminal is present in another country than his MNO/MVNO, and if no:
C—Verifying if the secure element is connected to his MNO/MVNO and if no:
D—Verifying if the cell ID is already memorized in the terminal or the secure element and, if no:
E—Clearing the location information files of the secure element and make a Refresh of the secure element;
F—Verifying again if the secure element is connected to the home MNO or MVNO and if no:
G—Storing the cell ID of the current telecommunication network in the terminal or in the secure element with the associated national MNO partner if it has not been previously stored.

Preferably, step E is executed after a call if the user was in a call during this step.

The steps above can be executed by an application installed in the secure element or in the terminal itself.

The invention also concerns an application for steering a terminal cooperating with a secure element in a telecommunication network to his home MNO or MVNO, the application being comprised in a secure element or a terminal cooperating with the secure element, the application comprising instructions able to:

A—Detect a cell ID change in the telecommunication network;
B—Verify that the terminal is present in another country than his MNO/MVNO, and if no:
C—Verify if the secure element is connected to his MNO/MVNO and if no:
D—Verify if the cell ID is already memorized in the terminal or the secure element and, if no:
E—Clear the location information files of the secure element and make a Refresh of the secure element;
F—Verify again if the secure element is connected to the home MNO or MVNO and if no:
G—Store the cell ID of the current telecommunication network in the terminal or in the secure element with the associated national MNO partner if it has not been previously stored.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. Where, FIG. 1 represents a workflow of the method of the invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

The invention provides a method to install in the secure element or in the terminal an application. The secure element by way of the method, Collects at least one partner operator (Orange™ for Free™ and Bouygues Telecom™ for SFR™) present in the EHPLMN file; Memorizes user localization (based on the cell ID) of the PLMNs that the terminal has selected and for which it is known that the home MNO or MVNO is not present (the home MNO or MVNO are defined in the EHPLMN file), which permits it to know the cells where the terminal is in national roaming; and Forces the terminal re-connection to this partner operator (Orange™ or Bouygues Telecom™) if needed, and if the application:

a—Detects a user location change in an area not previously memorized for this partner operator, and
b—Detects that the network is not the home network (MVNO Free™ or SFR™);
In case a or b, the application:
Forces the terminal to re-connect to the preferred partner (Orange™ or Bouygues Telecom™) and memorizes this partner and the location of the terminal;
In case of a call during this step, re-connects the terminal after the call.

A possible implementation is to implement an application in the secure element that uses:
A Refresh command,
A read EHPLMN instruction and
A user location memorization.

A mobile implementation is also possible. In this case, the application is installed in the terminal.

FIG. 1 represents a workflow of the method of the present invention. In this FIGURE, at step 10, the secure element detects a location change (the user is moving and the cell ID changes). At step 11, it is verified if the user is present in another country than his MNO/MVNO. If yes, the application verification ends (step 17). If no, the application verifies at step 12 if the secure element is connected to his MVNO or to his home MNO. If yes, the process ends (step 17). If no, the application verifies at step 13 if the location information with the connected MNO network is already memorized. If yes, the process ends (step 17). If no, the application clears the location information files (EF_LOCI, EF_PSLOCI, EF_EPSLOCI, . . . ) and does a Refresh (step 14). This Refresh is done after a call if the user was in a call during this step in order not to brutally end the call. At step 15, the application verifies again if the secure element is connected to his MVNO or to his home MNO. If yes, the process ends (step 17). If no (step 16), the application stores the location information with the associated national partner (MNO) if it has not been previously stored. The process then ends (step 17).

The invention claimed is:

1. A method for steering a terminal cooperating with a secure element in a telecommunication network to a user home MNO or MVNO, said method comprising the steps of:
   A—Detecting a cell ID change in said telecommunication network;
   B—Verifying that said terminal is present in another country than his MNO/MVNO, and if no:
   C—Verifying if said secure element is connected to user's MNO/MVNO and if no:
   D—Verifying if said cell ID is already memorized in said terminal or said secure element and, if no:
   E—Clearing the location information files of said secure element and make a Refresh of said secure element;
   F—Verifying again, after having performed step E, if said secure element is connected to said home MNO or MVNO and if no:
   G—Storing the cell ID of the current telecommunication network in said terminal or in said secure element with the associated national MNO partner if it has not been previously stored.

2. The method according to claim 1 wherein step E is executed after a call if the user was in a call during this step.

3. The method according to claim 1, wherein steps A-G are executed by an application installed in said secure element.

4. The method according to claim 1, wherein steps A-G are executed by an application installed in said terminal.

5. A secure element cooperating with a terminal, wherein said secure element is configured to steer said terminal in a telecommunication network to a user home MNO or MVNO, said secure element comprising instructions to:
   A—Detect a cell ID change in said telecommunication network;
   B—Verify that said terminal is present in another country than user's MNO/MVNO, and if no:
   C—Verify if said secure element is connected to user's MNO/MVNO and if no:
   D—Verify if said cell ID is already memorized in said terminal or said secure element and, if no:
   E—Clear the location information files of said secure element and make a Refresh of said secure element;
   F—Verify again, after having performed step E, if said secure element is connected to said home MNO or MVNO and if no:
   G—Store the cell ID of the current telecommunication network in said terminal or in said secure element with the associated national MNO partner if it has not been previously stored.

6. The secure element of claim 5, wherein said instructions configure a secure element in a phone of said user to perform steps A-G.

7. The secure element of claim 5, wherein said instructions configure a terminal cooperating with said secure element in a phone of said user to perform steps A-G.

8. The secure element of claim 5, wherein step E is executed after a call if the user was in a call during this step.

* * * * *